United States Patent
Gonzalez

[11] Patent Number: 5,864,187
[45] Date of Patent: Jan. 26, 1999

[54] FULLY ENCLOSED LINEAR MOTOR ARMATURE

[75] Inventor: Cesar Gonzalez, Troy, Mich.

[73] Assignee: Ford Global Technologies, Inc., Dearborn, Mich.

[21] Appl. No.: 827,145

[22] Filed: Mar. 27, 1997

[51] Int. Cl.⁶ ................................................. H02K 41/00
[52] U.S. Cl. ............................................. 310/12; 310/42
[58] Field of Search ................................. 310/12, 13, 14, 310/42, 43; 318/135

[56] References Cited

U.S. PATENT DOCUMENTS

| | | | |
|---|---|---|---|
| 3,668,444 | 6/1972 | Davey | 310/13 |
| 3,835,339 | 9/1974 | Laronze | 310/13 |
| 4,749,921 | 6/1988 | Chitayat | 318/135 |
| 4,839,545 | 6/1989 | Chitayat | 310/12 |
| 4,985,651 | 1/1991 | Chitayat | 310/12 |
| 5,138,292 | 8/1992 | Forster | 335/278 |
| 5,179,304 | 1/1993 | Kenjo et al. | 310/12 |
| 5,179,343 | 1/1993 | Chishima et al. | 324/538 |
| 5,361,024 | 11/1994 | Wisner et al. | 318/588 |
| 5,376,910 | 12/1994 | Geringer et al. | 335/278 |
| 5,416,397 | 5/1995 | Mazzara et al. | 318/696 |
| 5,620,646 | 4/1997 | Sparer et al. | 310/54 X |

FOREIGN PATENT DOCUMENTS

| | | |
|---|---|---|
| 2809070 | 9/1978 | Germany . |
| 61-170247 | 7/1985 | Japan . |
| 04183258 | 11/1990 | Japan . |
| WO 88/02948 | 4/1988 | WIPO . |

*Primary Examiner*—Nestor Ramirez
*Assistant Examiner*—Judson H. Jones
*Attorney, Agent, or Firm*—Mark S. Sparschu; Roger L. May

[57] ABSTRACT

A linear motor armature includes a sealed metal case having a base portion with at least one cooling channel formed therein and having a central chamber. An epoxy block is disposed within the central chamber. A lamination stack is disposed within the epoxy block. A coil assembly is disposed within the lamination stack, and the coil assembly is cooled by means of the cooling channel. Preferably, more than one cooling channel is provided to facilitate bi-directional cooling flow.

10 Claims, 4 Drawing Sheets

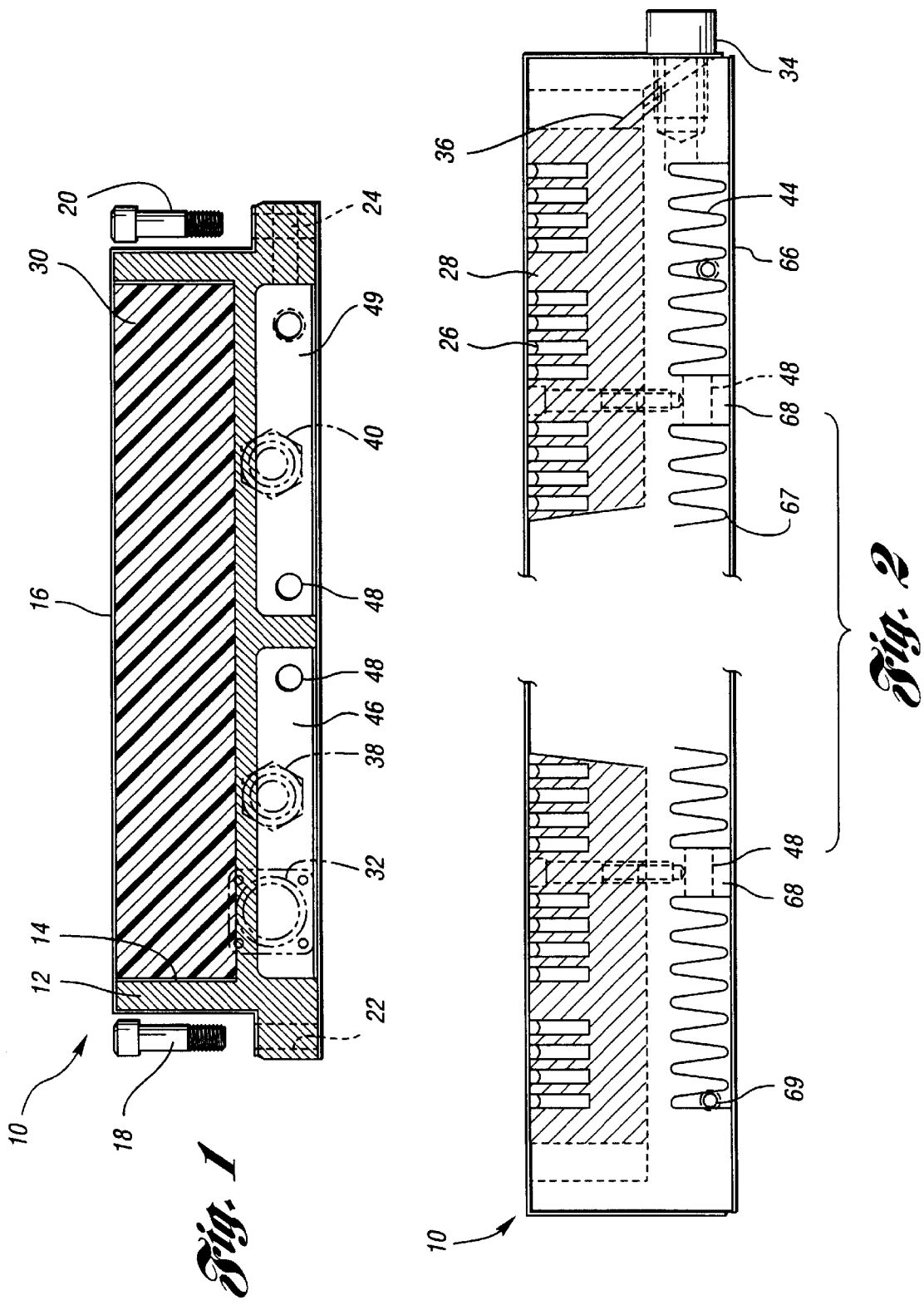

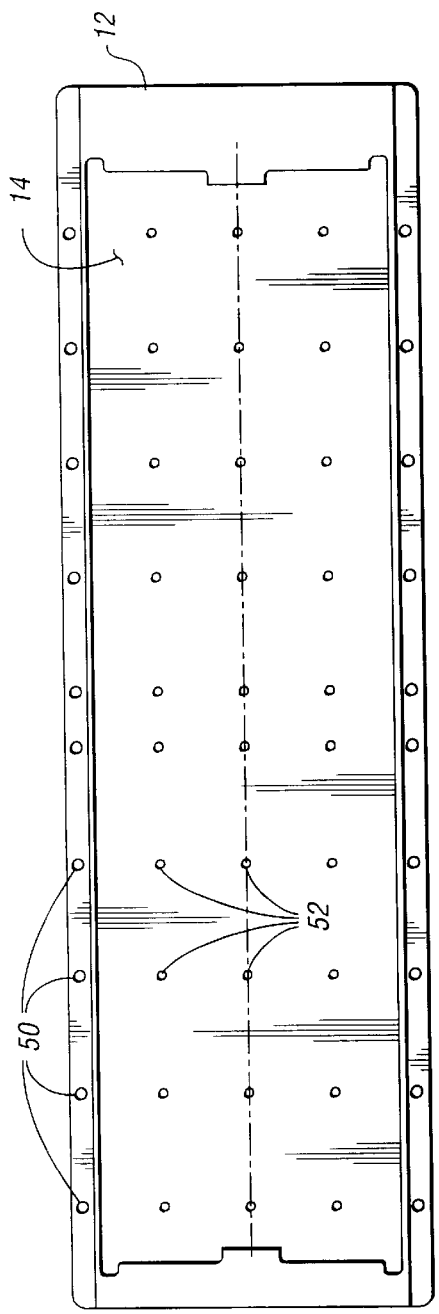
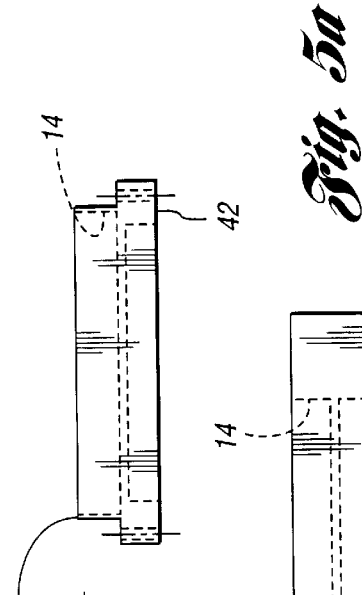
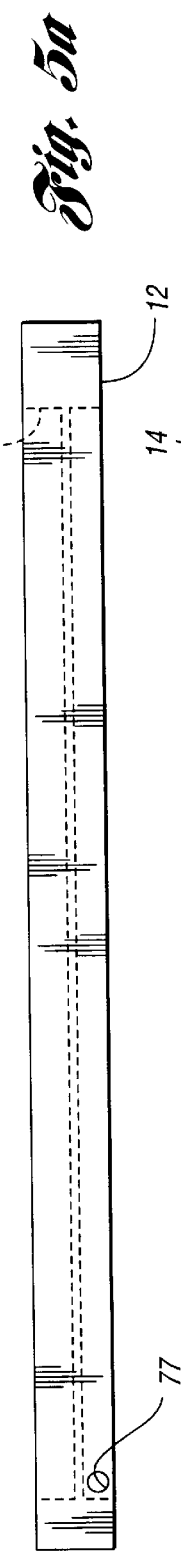
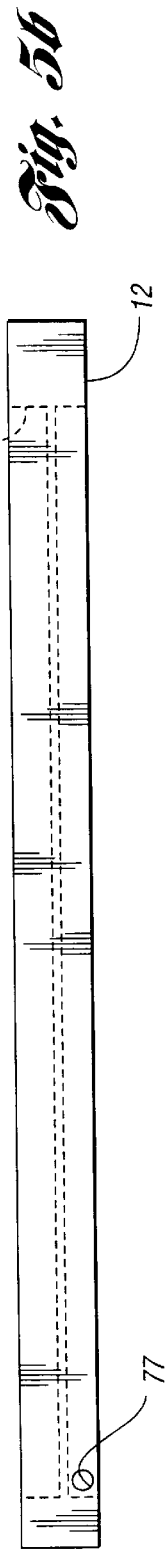

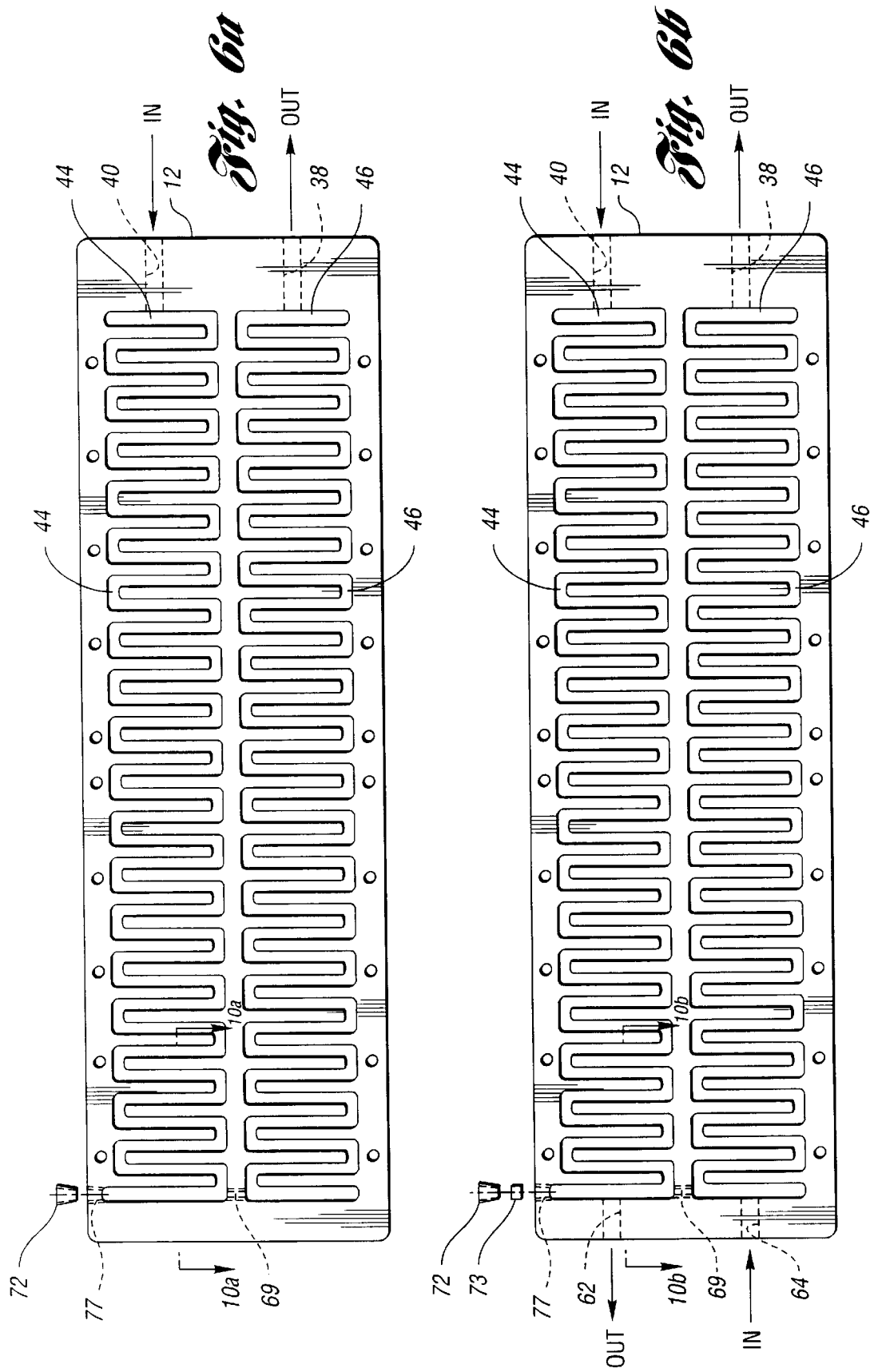

FULLY ENCLOSED LINEAR MOTOR ARMATURE

TECHNICAL FIELD

The present invention relates to linear motors, and more specifically to a fully enclosed linear motor armature in which the armature is enclosed in a sealed metal case to facilitate epoxy molding and cooling.

BACKGROUND OF THE INVENTION

Many manufacturing applications require the generation of a linear force for movement of machining equipment. Conventional A/C and D/C motors produce a rotary torque about an axis which must be converted into a linear force before it can be used in such applications. Such conversion is accomplished by a screw and nut, a sheave and cable, or a rack and pinion, among others. These designs are problematic in that they tend to wear out relatively quickly, and they are incapable of producing high linear speeds.

Linear motors are also known which directly produce a linear force in response to an electric input. Typically, a linear motor takes advantage of the variable magnetic reluctance produced in the vicinity of slots in a pole face of a magnetic member. An armature of a magnetic material, having windings therein, is urged to step from position to position along the pole face as defined by the slots or, alternatively, the magnetic member is movable while the armature is stationary.

In such designs, the armature portion usually comprises a coil disposed within a lamination stack, and surrounded by an epoxy block. A cooling tube is typically provided adjacent the epoxy block for drawing heat from the armature.

The force which such linear motors are capable of producing is limited by resistive heating in the windings of the armature of the motor. The normally used copper cooling tube requires mechanical retention within the epoxy case, and provides somewhat limited armature cooling capacity. Accordingly, it is desirable to provide an improved armature design with increased cooling capacity.

Another problem with such designs is that the epoxy molding may create difficulty in manufacturing the armature. The epoxy is typically molded around the coil and laminate stack within a separate mold. It is then removed from the mold and trimmed, and the mold is cleaned out for the next molding operation. These steps require handling which adds manufacturing cost. Additionally, the wire harness typically gets wet and is subject to damage during epoxy molding and grinding of the epoxy block.

Another shortcoming of prior art designs is that wire harnesses extending from the epoxy block are typically unprotected and exposed to damage or moisture during operation of the linear motor. Wire harness damage may result in substantial downtime for the equipment.

A further shortcoming of prior art designs is that such designs are typically limited to a single-pass cooling arrangement wherein a cooling fluid travels from one end of the armature to another. In this configuration, the cooling fluid may be substantially heated by the time it reaches the opposing end of the armature, and therefore uneven cooling occurs.

DISCLOSURE OF THE INVENTION

The present invention overcomes the above-referenced shortcomings of prior art linear motors by providing a linear motor with an armature which is fully enclosed within a sealed metal case. The epoxy block is molded directly within the case, thereby eliminating the need for separate molding operations. The metal case includes a pair of cooling channels formed integrally therein to facilitate single pass or bi-directional two pass cooling. The wiring harnesses are connected to the armature within moisture-sealed mechanical fittings. In this configuration, the sealed metal case in conjunction with the mechanical fittings prevent moisture from contacting the armature and shorting out the motor.

More specifically, the present invention provides a linear motor armature including a sealed metal case having a base portion with at least one cooling channel formed therein, and having a central chamber. An epoxy block is disposed within the central chamber. A lamination stack is disposed within the epoxy block, and a coil assembly is disposed within the lamination stack. The coil assembly is cooled by means of the cooling channel.

The present invention also provides a method of manufacturing a linear motor armature, comprising: 1) providing a sealable metal case with a central chamber formed therein and a base portion; 2) installing a coil assembly and lamination stack within the central chamber; 3) molding epoxy over the coil assembly and lamination stack within the central chamber; and 4) sealing the central chamber. In a preferred embodiment, moisture-sealed mechanical fittings are provided for carrying electrical connectors to the armature, and a plurality of cooling channels are formed in the metal case to facilitate bi-directional cooling.

Accordingly, an object of the present invention is to provide an improved linear motor armature in which heat dissipation is enhanced for improved performance, and the armature is fully enclosed to prevent entry of moisture.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a schematically arranged partially exploded sectional view of a linear motor armature in accordance with the present invention;

FIG. 2 shows a longitudinal cross-section of the armature shown in FIG. 1;

FIG. 3 shows a plan view of an armature casing in accordance with the present invention;

FIG. 4A shows an end view of the armature casing of FIG. 3 in accordance with a single-pass cooling arrangement;

FIG. 4B shows an end view of the armature casing of FIG. 3 in accordance with a two-pass cooling arrangement;

FIG. 5A shows a side view of the armature casing of FIG. 3 in accordance with the single-pass cooling arrangement;

FIG. 5B shows a side view of the armature casing of FIG. 3 in accordance with the two-pass cooling arrangement;

FIG. 6A shows a partially exploded bottom view of the armature casing of FIG. 3 in accordance with the single-pass cooling arrangement;

FIG. 6B shows a partially exploded bottom view of the armature casing of FIG. 3 in accordance with the two-pass cooling arrangement;

DETAILED DESCRIPTION OF THE PREFERRED EMBODIMENT

Figure 8:
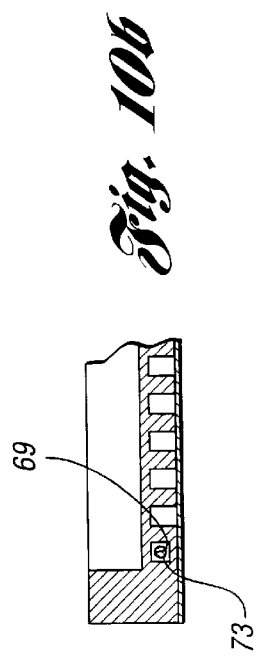
FIG. 8 shows an end view of the armature shown in FIG. 7.

Referring to FIGS. 1 and 2, a linear motor armature 10 is shown in accordance with the present invention. The linear motor armature 10 comprises a sealed metal case 12, which is preferably aluminum or steel, having a central chamber 14 formed therein. The central chamber 14 is sealed by means of a cover 16, which is attached to the case 12 by the bolts 18,20, which extend, respectively, through the apertures 22,24. The cover 16 may also be adhesively bonded or welded to the case 12. Within the central chamber 14 is disposed the coil assembly 26, which is disposed within a lamination stack 28 within an epoxy block 30.

In order to provide current to the coil assembly 26 via a wiring harness, mechanical fittings 32,34 are provided, as shown in FIG. 8. Referring back to FIG. 2, the mechanical fittings, such as mechanical fitting 34, facilitate moisture-protected attachment of wiring harnesses, such as harness 36.

The armature 10 is also provided with fittings 38,40 for coolant entry. The sealed case 12 also includes a base portion 42, with a pair of cooling channels 44,46 formed therein. FIG. 2A illustrates "cooling variation A". The coolant flows under the cooling ribs through space 67, and through support ribs 68 via interconnect holes 48. FIGS. 6A and 6B illustrate the serpentine cooling channels. The coolant flows through the cooling channel rather than under. The cooling channels may be cast or machined.

The case 12 is more clearly illustrated in FIGS. 3–6. As shown, the case 12 includes a base portion 42 with cooling channels 44,46 formed therein. A central chamber 14 is formed in the top portion of the case 12 for housing the coil assembly and lamination stack, encased in an epoxy block. The case 12 further includes mounting holes 50 for mounting the case 12 to a machine. Coil mounting holes 52 are provided for mounting the coil(s) within the central chamber 14. With the cooling channels 44,46 configured as such, it is possible to connect the cooling channels for bi-directional flow such that one channel has coolant flowing in one direction and a second channel has coolant flowing in the opposite direction to provide even cooling across the length of the armature 10.

Figure 7:
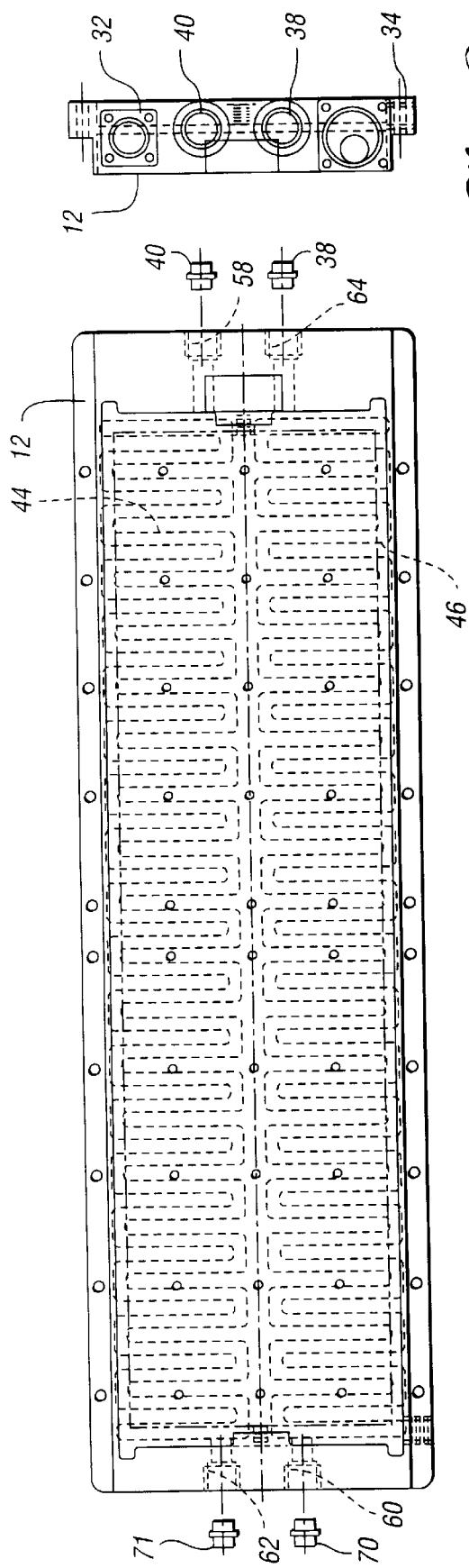
FIG. 7 shows a plan view of a linear motor armature in accordance with the present invention.
Figure 9:
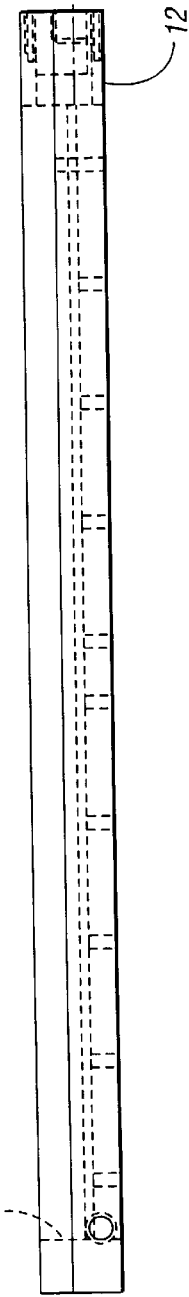
FIG. 9 shows a side view of the armature shown in FIG. 7.

As illustrated in FIG. 7, cooling channels 44,46 may have inlets 58,60 and outlets 62,64, respectively, to facilitate such bi-directional flow. Additionally, water inlet fittings 38,40 are provided for attachment to the inlet 58 and outlet 64, as shown in FIG. 8. Fittings 70 and 71 are provided for apertures 60 and 62.

Figure 10B:
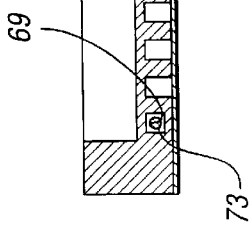
FIG. 10B shows a sectional view taken at line 10b–10b of FIG. 6B.
Figure 10A:
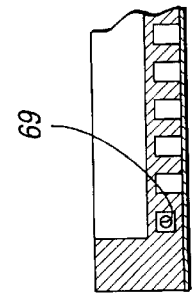
FIG. 10A shows a sectional view taken at line 10a–10a of FIG. 6A.

In FIG. 6A, interconnect hole 69 is left unplugged (as shown in FIG. 10A) for single-pass cooling mode. In this configuration, the cooling fluid flows into aperture 40, through channel 44, through aperture 69, and returns to aperture 38 through channel 46. Only outer plug 72 is used. In FIG. 6B, interconnect hole 69 is plugged (such as by plug 73 shown in FIGS. 6B and 10B) for two pass cooling mode. Inner plug 73 is installed first through access hole 77 and then outer plug 72 follows (see FIG. 6B). In this two-pass cooling mode, cooling fluid flows in channel 44 from aperture 40 to aperture 62, and cooling fluid also flows in channel 46 from aperture 64 to aperture 38.

Accordingly, heat dissipation is enhanced by cooling the case 12 directly through the cooling channels 44,46 and the traditional copper cooling tubes are eliminated. Additionally, using this configuration, the epoxy block 30 may be molded directly within the central chamber 14 of the case 12, which eliminates the need for other such molds and the related handling. Furthermore, the mechanical fittings 32,34 facilitate moisture-free attachment of electrical connectors to the coil. Additionally, by sealing the metal case with the central chamber cover 16 and cooling channel cover 66 (shown in FIGS. 1–2), entry of moisture into the armature is prevented, thereby preventing shorting out of the coil.

The present invention also provides a method of manufacturing a linear motor armature, comprising: 1) providing a sealable metal case with a central chamber formed therein and a base portion; 2) installing a coil assembly and lamination stack within the central chamber; 3) molding epoxy over the coil and lamination stack within the central chamber; and 4) sealing the central chamber. The method may further comprise forming first and second cooling channels in the base portion; sealing the cooling channels; and flowing a cooling fluid through the first and second cooling channels in opposing directions to facilitate bi-directional cooling of the coil. The method may further comprise providing at least two moisture-sealed mechanical fittings on the metal case for sealed attachment of electrical connectors to the coil.

By providing integral cooling chambers within the case and providing multi-paths or bi-directional cooling, enhanced performance is achieved because heat dissipation is increased.

While the best mode for carrying out the invention has been described in detail, those familiar with the art to which this invention relates will recognize various alternative designs and embodiments for practicing the invention within the scope of the appended claims.

What is claimed is:

1. A linear motor armature, comprising:
 a sealed metal case having a base portion with at least one cooling channel formed therein and having a central chamber;
 an epoxy block disposed within the central chamber;
 a lamination stack disposed within the epoxy block; and
 a coil assembly disposed within the lamination stack, wherein the coil assembly is cooled by means of said at least one cooling channel.

2. The linear motor armature of claim 1, further comprising at least two moisture-sealed mechanical fittings extending from the sealed metal case for attachment of electrical connectors to said coil assembly.

3. The linear motor armature of claim 1, wherein said at least one cooling channel comprises two serpentine flow channels formed in the base portion to facilitate bi-directional cooling flow.

4. The linear motor armature of claim 1, wherein said sealed metal case further comprises a central chamber cover disposed over the central chamber and a cooling channel cover disposed over said at least one cooling channel.

5. The linear motor armature of claim 1, wherein said sealed metal case comprises cast aluminum.

6. A method of manufacturing a linear motor armature, comprising:
 providing a sealable metal case with a central chamber formed therein and a base portion;
 installing a coil assembly and lamination stack within the central chamber;

molding epoxy over said coil assembly and lamination stack within the central chamber; and sealing the central chamber.

7. The method of claim 6, further comprising:

forming first and second cooling channels in the base portion;

sealing the cooling channels; and flowing a cooling fluid through the first and second cooling channels in opposing directions to facilitate bi-directional cooling of said coil assembly.

8. The method of claim 6, further comprising providing at least two moisture-sealed mechanical fittings on the metal case for sealed attachment of electrical connectors to said coil assembly.

9. A linear motor armature, comprising:

a sealed metal case having a base portion with two serpentine cooling channels formed therein and the metal case having a central chamber;

an epoxy block disposed within the central chamber;

a lamination stack disposed within the epoxy block; and a coil assembly disposed within the lamination stack, wherein the coil assembly is cooled by means of said at least one cooling channel.

10. The linear motor armature of claim 9, further comprising at least two moisture-sealed mechanical fittings extending from the metal case for attachment of electrical connectors to said coil assembly.

* * * * *